SECTION THRU "B"

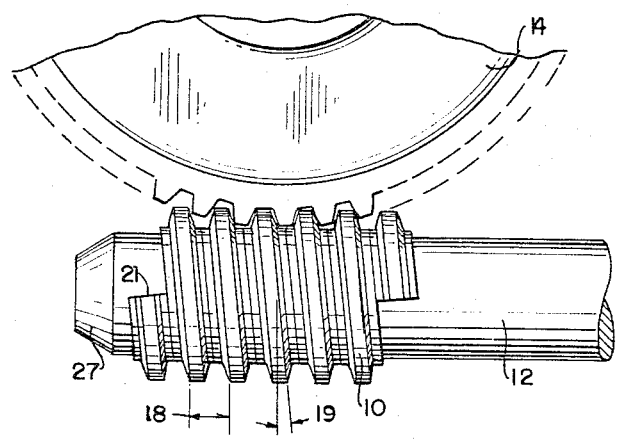
FIG. 1
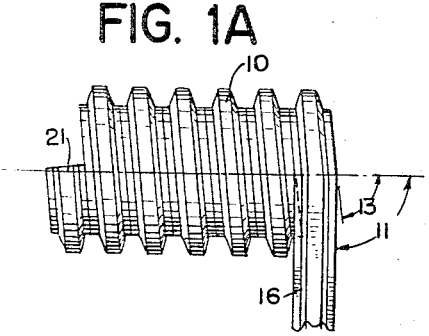
FIG. 1A
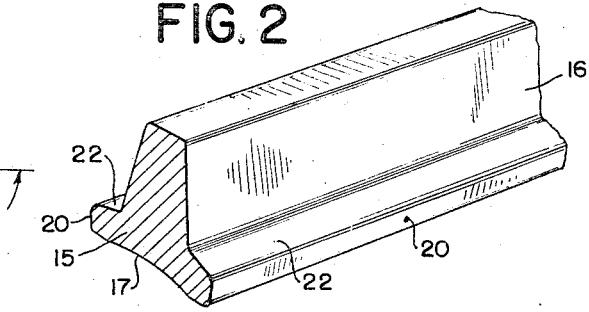
FIG. 2
FIG. 10
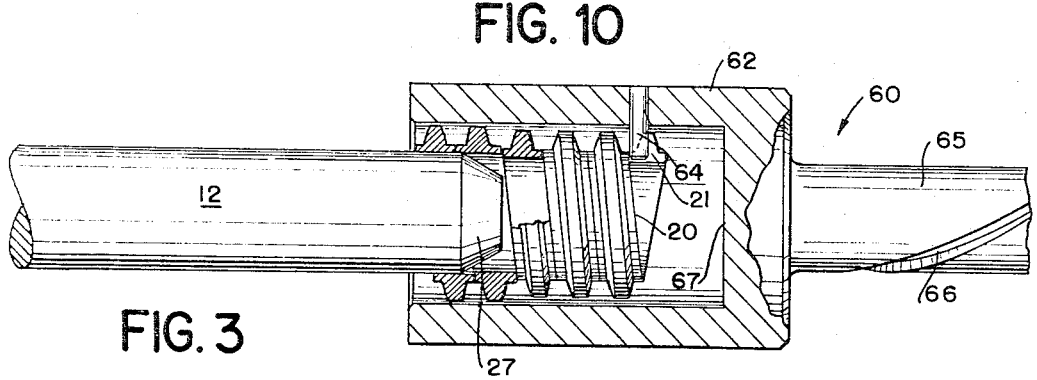
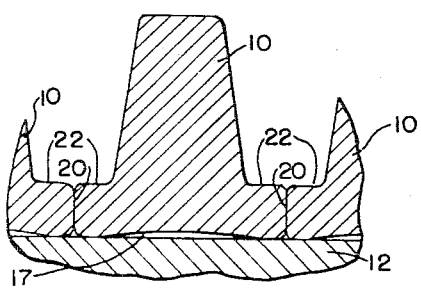
FIG. 3
*INVENTORS*
BERNHARD ULRICH, JR.
PHILIP ULRICH
BY *Darby & Darby*
ATTORNEYS

SECTION THRU "C"

United States Patent Office 3,313,172
Patented Apr. 11, 1967

3,313,172
WORMS FOR WORM AND WORM WHEEL ASSEMBLY AND METHOD OF FORMING THE SAME
Bernhard Ulrich, Jr., and Philip Ulrich, Corpus Christi, Tex., assignors to Ulrich Bros., Inc., Corpus Christi, Tex., a corporation of Texas
Original application Nov. 3, 1961, Ser. No. 150,026, now Patent No. 3,186,082, dated June 1, 1965. Divided and this application Jan. 4, 1965, Ser. No. 423,013
4 Claims. (Cl. 74—458)

This application is a continuation-in-part of our co-pending application Ser. No. 757,637, filed Aug. 27, 1958, now abandoned, and a division of our copending application Ser. No. 150,026, filed Nov. 3, 1961, now Patent No. 3,186,082.

This invention relates to improvements in worm thread construction and more particularly to mounting a coiled worm thread form on a shaft to form a precision worm to mesh with a worm gear, worm wheel or worm sector.

This invention comprises constructing a worm element for use in heavy duty as well as small mechanisms or light load machinery. By this invention, a worm of any desired pitch or size within certain ranges may be easily produced at small cost and having tolerances comparable to machined threads, and the character or shape of the worm threads may take many different forms without change or appreciable effect upon the cost or method of production.

Worm gearing is commonly employed to obtain higher velocity rations than can conveniently be obtained from other forms of gearing. Worm gear drives are less efficient than some other forms of gear drives and have a much higher velocity of sliding in relation to rolling.

Heretofore, worms for heavy duty and precision work were machined from solid stock, preferably by a generating process. Equipment for these processes is expensive and requires skilled help to set up and operate. While worms are also cast, even with the improved casting processes available today, castings are not suitable for high speeds and are used primarily for the cost differential. Also, because of the high sliding velocities encountered and the necessity for minimum friction, the range of suitable materials for worm gears is much more limited than for other types of gears. Heretofore, a bronze wheel rim and a case-hardened steel worm, ground and polished, were the best combination for efficiency and long life.

To reduce cost of worm gearing, various attempts were made to avoid machining the worm. These attempts were little more than winding wire or rods on a shaft in the form of a helix and fastening the helix to the shaft. These proved unsuccessful except for the most light duty work, since the application of any load with the resulting stress concentrations along the line of contact between the worm and worm wheel caused shifting of the worm helix resulting in uneven wear, binding of the worm wheel, short life and generally unsatisfactory performance.

Therefore, it is an object of this invention to construct a worm by forming a helical element of the desired pitch, lead, pitch angle, and depth and fixedly mounting the same on a shaft or spindle solely by the inherent resiliency of the helical element itself and being clamped securely on the shaft by friction without requiring set screws, pins, keys or adhesives.

It is furthermore an important object of this invention to construct a worm mechanism wherein a helical element of any desired pitch, lead angle and configuration is first formed from suitable material with an axial compressive force exerted between adjacent threads by reason of the forming process, which element is radially expanded and slid over a shaft and when returning to its original position is securely mounted on the shaft, thus providing an inexpensive method of manufacturing and assembling worms suitable for heavy duty, precision, high speed use.

A further object is to fabricate a helical element so that the worm thread assumes precisely the desired form and lead or pitch when coiled into the helical coil shape with the faces on either side of the base of the thread form being continuously urged in continuous contact between successive turns of the coil to fix and maintain during use the required pitch of the worm.

A further object is to make the thread circular in cross-section and mount it in a shallow V-shaped groove having the desired lead on the shaft, for providing variable line contact between the base portion of the thread and the side edges of the groove to fix the pitch of the worm on the shaft in a secure manner, regardless of the wear of the tool.

Still another object is to provide a mechanism to mount and dismount the coiled element on a shaft in an easy, facile manner to provide a simple manner to assemble the worms.

Another object is to provide a worm which only the coiled member need be hardened and to eliminate separate hardening of the assembled worm.

Further and more specific objects will appear in the following detailed description of several modifications of the present invention, as illustrated in the accompanying drawings, wherein:

FIG. 1 is an elevational front view of one form of a worm made in accordance with the present invention mating with a worm wheel;

FIG. 1A shows diagrammatically one form of coiling the helix to provide continuous compression between adjacent coils;

FIG. 2 is an enlarged perspective view of one form of bar material from which the coil thread of the worm in FIG. 1 can be made;

FIG. 3 is an enlarged cross-sectional view of a worm thread segment on a shaft shown in FIG. 1;

FIG. 10 is one form of a mechanism for mounting worm threads on the shafts.

Figure 5:
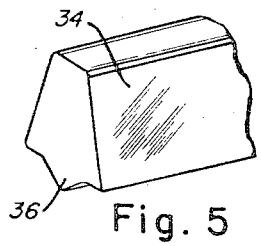
FIGS. 4 to 6 are views corresponding to FIGS. 1 to 3 of another embodiment of the invention.

The material for fabricating the helical form in any of the three modifications is preferably cold drawn steel and the shaft could be an inexpensive type of softer steel. However, other metals or materials could be used.

Advantageously, in the present invention, a smooth, hard surface of the desired shape is obtained by cold drawing the rod material through a die, which provides a strong, hard, long wearing thread form at low cost. Ordinarily, there is no need for further heardening the assembled worm, such as heretofore required.

The coiled thread which is to be mounted on a shaft is coiled so that its inner diameter is slightly smaller than the outer diameter of the shaft on which it is to be mounted. Additionally, as shown in FIG. 1A, in forming the coiled thread, the axis of the bar 16 being wound is at a greater angle to the axis of the coil, indicated at 11 than is the tangent to the helix of the coiled thread, shown at 13. This difference in angle imparts a continuous compressive force on the individual coils for continuously maintaining adjacent threads in abutting relation and maintaining the desired pitch during heavy duty operation.

Although the drawings and descriptions of the embodiments herein describe a single-lead worm, multiple-lead worms are fabricated substantially the same.

Various shaft end forms are feasible. The shaft end is preferably tapered or reduced in size, e.g., a step reduction.

Various types of suitable bearings may be used in conjunction with the end or ends of the shaft.

More specifically, with respect to the embodiment illustrated in FIGS. 1 to 3, a coiled worm element 10 is mounted on a shaft 12, which forms a worm to mesh with a worm wheel 14, which may be a worm gear, or a worm gear sector. Shaft 12 has a tapered end 27.

Advantageously, coiled worm element 10 is formed from a bar material 16 shown in FIG. 2 in a manner similar to that shown in FIGURE 1A. Bar 16 has a base 15 having an inwardly curved concave portion 17 and shoulders 22 on opposite sides. Shoulders 22 have outer faces 20 tapered downwardly and inwardly. Bar 16 may be extruded, molded or otherwise fabricated to the shape as shown. However, a cold drawing process has been found to be preferable in that the bar material in being formed to the desired shape is work hardened during the drawing process for providing a hard surface of accurate dimensions without further machining.

Bar material 16 is coiled in a manner illustratively shown in FIG. 1A to provide a series of helices having the desired pitch angle 19 and under axial compression along the length of the coil, so that faces 20 are urged in continuous contact with corresponding adjacent faces and will not separate when engaging a worm wheel during transmission of power.

In the coiled position, bar 16 assumes the form shown in FIG. 3, wherein surface 17 approaches a planar surface and surfaces 20 approach perpendicularly to surface 17. It is important that surface 17 does not pass beyond a planar surface to assume a convex shape.

Coil 10 has a smaller internal diameter than the outer diameter of shaft 12. Advantageously, coil element 10 is mounted on shaft 12 in a manner shown in FIGURE 10. An assembling wrench 60 has a socket head 62 having an inner diameter slightly greater than the outer diameter of the assembled worm. Directed downwardly from an inner surface of socket head 62 is an arm or tooth 64. Socket head 62 is capable of being rotated in any convenient manner such as by shaft 65 and urged forward simultaneously. Flutes or helical threads 66 aid this operation. In use, coil element 10 is placed coaxial to and abutting tapered end 27 of shaft 12. Since the inner diameter of coil 10 is smaller than the outer diameter of shaft 12, only the tapered end 27 of shaft 12 is received within coil 10 to aid in properly aligning coil 10. Advantageously, shaft 12 is held stationary by a fixture (not shown) to prevent axial or rotational movement during assembly. The free end of coil element 10 is received within the open socket head 62, so that arm 64 engages transverse end 21 and face 20 of coil element 10. Socket head 62 is rotated clockwise when viewed from the right side of the drawing and urged towards shaft 12. Since shaft 12 resists forward axial movement of coil 10, arm 64 tends to unwind coil 10 which expands the inner diameter of coil element 10 and allows it to be slidably and rotationally mounted on shaft 12 to its desired position. Arm 64 rotates coil 10 via engagement with end 21 and moves coil 10 axially by engagement with face 20. Assembly 60 is removed and coil element 10 attempts to return to its original form and assumes the shape as shown in FIGURE 1, which is a desired shape of worm 10. As seen in FIGURE 3, surface 17 is slightly concave or approaching flat and abuts the outer surface of shaft 12 along the outer edges of base 15. This abutment prevents rocking of individual coils during periods of high stress during operation. Additionally, the inwardly directed radial force exerted by coil element 10 on shaft 12 fixedly maintains coil element 10 on shaft 12 without any lateral displacement during heavy duty use. Similarly, the compressive forces on the indvidual coil prevent separation of the coils during transmission of power, while functioning as a worm. The pitch 18 of the worm thus fabricated is permanently and accurately fixed.

To dismount coil 10 from shaft 12, a similar mechanism may be used but with a removable arm 64 disposed adjacent the front end of the socket. After the socket has been placed over the mounted coil, the arm 64 would be inserted and the socket rotated and axially moved in directions opposite to those mentioned above for assembly.

The coiled form may be mounted on shafts which are already a component part of driving devices such as motors and may be readily removed from the shaft for replacement.

The assembled worm provides tolerances comparable to machined gear teeth. For example, a worm with 48° diametral pitch, 20° pressure angle, single lead on a 3/16 inch diameter shaft has a lead error of only 0.0002 inch per convolution, pitch line run out of 0.0003 inch and tooth form within 0.0002 inch.

Figure 6:
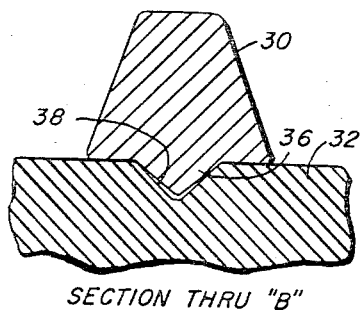
Figure 4:
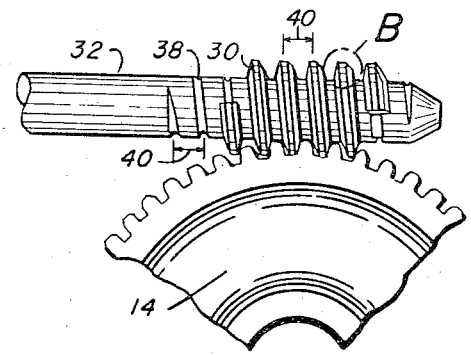

In the embodiment illustrated in FIGS. 4 to 6, a coiled worm form 30 is mounted on a shaft 32.

Tooth form 30 may be fabricated by substantially the same methods as described above with respect to the first embodiment. Bar material 34 has no base flanges but a downwardly extending rib 36 to fix the pitch of the coil thread on shaft 32.

Shaft 32 has a helical groove 38, preferably V-shaped cut or machined about its periphery. The groove is cut to the desired lead or pitch 40 and has the desired pitch angle.

Groove 38, being relatively shallow, may be machined or cut with a single-point tool on a suitable lathe or other machine.

Coil form 30 is mounted on shaft 32 with continuous rib 36 received within groove 38, so that the lead or pitch 40 of the coil, shown as a single thread, is thus permanently and accurately fixed.

The coiled form may be readily removed for replacement.

Figure 7:
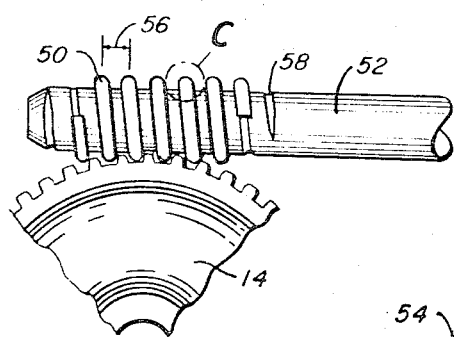
FIGS. 7 to 9 are corresponding views of a third modification.
Figure 8:
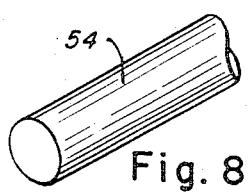
Figure 9:
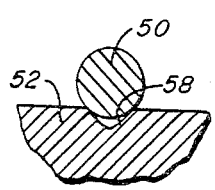

In the embodiment shown in FIGS. 7 to 9, a coiled, round thread form 50 is mounted on a shaft 52.

The round form 50 may be fabricated by substantially the same method as in the embodiments discussed above, using round bar material 54.

The shaft 52 has a helical groove, preferably a V-groove 58 cut or machined on its periphery. This groove 58 is cut to the lead or pitch 56, shown for a single thread, as required.

The groove being relatively shallow may be machined or cut with a single point tool on a suitable lathe or other machines.

The contour of the groove is such that round stock 54 coacts with the groove along line contact which is close to the outer diameter of shaft 52, thus preventing any axial movement of the coil.

The coil form 50 is mounted on shaft 62 in groove 58 in any convenient manner such as threading.

The inner diameter of coil 50 before mounting on shaft 52 is smaller than the outer diameter of shaft 52. After being mounted on shaft 52, coil 50 assumes the lead or pitch 56 of groove 58 in the shaft. The lead or pitch of the round form is thus permanently and accurately fixed. Additionally, since round stock 54 makes line contact with groove 58, the desired pitch or lead will be obtained on succeeding worms regardless of the wear of the tool cutting groove 58.

In the embodiments shown in FIGURES 4-8, the coils are not required to have the precise lead before assembly as desired after assembly. The coil assumes the lead of the groove on the shaft on which it is mounted.

Since many variations of the foregoing described device can be readily devised without departing from the spirit of the present invention, it is to be understood that this description is illustrative only and is not to be construed in a limiting sense, the present invention being defined solely by the appended claims.

We claim:
1. A worm thread device comprising a cylindrical shaft and a helical coil mounted on the outer circumference of said shaft and forming a series of convolutions, said convolutions having a predetermined pitch angle and pitch and continuously exerting a radially inwardly directed force on said shaft for being fixedly mounted thereon, said coil being formed from a bar having a base flange and being wound at a greater angle to the axis of said coil than the angle the tangent to a helical convolution makes to said axis for providing a reactionary axial compressive force on said convolutions to axially pretension said coil, said compressive force continuously urging the outer edge of said flange in continuous abutting relation to an adjacent convolution for maintaining said predetermined pitch angle and said pitch during operation.

2. A worm thread device comprising a cylindrical shaft and a bar having oppositely directed flanges helically coiling about the outer circumference of said shaft and forming a series of convolutions, each having a predetermined pitch and pitch angle, said convolutions exerting a radially inwardly directed force on said shaft for affixing said convolutions thereto, said convolutions being pretensioned to exert a reactionary longitudinal compressive force on said helical coil so that facing edges of flanges of consecutive convolutions are continuously urged into abutting relationship in response to said longitudinal compressive force, said bar having an upstanding rib for forming the thread of said worm of predetermined pitch, whereby said pitch is continuously maintained during operation of said worm in response to said radial and longitudinal compressive forces.

3. A helical coil for mounting on a shaft to form a helically coiled bar having base flanges of a predetermined width for forming a series of convolutions, said coil having a smaller internal diameter than the outer diameter of said shaft, the coils of said convolutions being provided with a smaller helix angle during winding than said convolutions for exerting an axial compressive force and pretensioning said convolutions, said convolutions being adapted to be mounted on said shaft and exert reactionary radial compressive forces thereon, whereby said radial and axial compressive forces bond said convolutions to said shaft for providing a predetermined and fixed lead.

4. A device for assembling a helically coiled thread on a shaft to form a worm comprising a tubular head having an inner diameter slightly greater than the outer diameter of said worm, and arm inwardly directed from said tubular head and adapted to cooperate with one end of said helical coiled thread, and means to simultaneously rotate and move said head forward to expand and urge said coiled thread onto said shaft to a predetermined distance.

References Cited by the Examiner
UNITED STATES PATENTS

| | | | |
|---|---|---|---|
| 85,454 | 12/1868 | Krieg | 74—458 |
| 240,780 | 4/1881 | Smith | 74—458 |
| 1,181,971 | 5/1916 | Lovell | 74—458 |

DAVID J. WILLIAMOWSKY, Primary Examiner.

L. H. GERIN, Assistant Examiner.